(12) United States Patent
Laas et al.

(10) Patent No.: US 6,444,778 B1
(45) Date of Patent: Sep. 3, 2002

(54) PROCESS FOR THE PRODUCTION OF URETDIONE POLYISOCYANATES WITH IMPROVED MONOMER STABILITY

(75) Inventors: Hans-Josef Laas, Gladbach; Reinhard Halpaap, Odenthal; Dieter Mager, Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/906,194

(22) Filed: Jul. 16, 2001

(30) Foreign Application Priority Data

Jul. 19, 2000 (DE) .......................................... 10035013

(51) Int. Cl.$^7$ ............................................... C08G 18/30
(52) U.S. Cl. .......................................... 528/61; 528/60
(58) Field of Search ...................................... 528/61, 60

(56) References Cited

U.S. PATENT DOCUMENTS

| | | | |
|---|---|---|---|
| 4,614,785 A | 9/1986 | Richter et al. ................ 528/45 |
| 5,258,508 A | 11/1993 | Scholl ........................ 540/202 |
| 5,315,004 A | 5/1994 | Goldstein et al. ........... 540/202 |
| 5,449,775 A | 9/1995 | Bruchmann et al. ........ 540/202 |
| 5,461,135 A | 10/1995 | Malofsky et al. ............. 528/60 |
| 5,502,149 A | 3/1996 | Yoshida et al. .............. 528/60 |
| 5,565,527 A | 10/1996 | Bruchmann et al. ........ 525/281 |
| 5,641,851 A | 6/1997 | Wolff et al. ................... 528/44 |
| 5,919,887 A | 7/1999 | Graf et al. .................... 528/45 |
| 6,297,343 B1 * | 10/2001 | Laas et al. ..................... 528/45 |
| 6,342,576 B1 * | 1/2002 | Wenning ...................... 528/44 |
| 6,376,637 B1 * | 4/2002 | Bruchmann et al. .......... 528/60 |
| 6,380,343 B1 * | 4/2002 | Orikabe et al. ............... 528/75 |

FOREIGN PATENT DOCUMENTS

| | | |
|---|---|---|
| WO | 97/45399 | 12/1997 |
| WO | 99/07765 | 2/1999 |

OTHER PUBLICATIONS

J. prakt. Chem. 336 (month unavailable) (1994) pp. 185–200, Übersichtsartikel—Review Article, Zur Synthese aliphatischer Polyisocanate–Lackpolyisocyanate mit Biuret–, Isocyanurat– oder Uretdionstruktur, Hans Josef Laas, Reinhard Halpaap und Josef Pedain.

* cited by examiner

*Primary Examiner*—Deborah C. Lambkin
(74) *Attorney, Agent, or Firm*—Joseph C. Gil; Thomas W. Roy

(57) ABSTRACT

The invention relates to a process for the production of uretdione polyisocyanates with improved storage stability and their use as a starting component for polyurethane plastics, in particular as a crosslinker component for the production of two-component polyurethane coating compositions.

14 Claims, No Drawings

PROCESS FOR THE PRODUCTION OF URETDIONE POLYISOCYANATES WITH IMPROVED MONOMER STABILITY

BACKGROUND OF THE INVENTION

1. Field of the Invention

The invention relates to a process for the production of uretdione polyisocyanates and coating compositions and polyurethane plastics containing these uretdione polyisocyanates.

2. Description of the Prior Art

The production of polyisocyanates having uretdione groups by catalytic dimerization and optionally simultaneous trimerization (generic term: oligomerization) of monomeric aliphatic or cycloaliphatic diisocyanates is known. The advantages and disadvantages of the various dimerizing catalysts or catalyst systems are discussed at length in literature (cf. e.g. J. Prakt. Chem. 336 (1994) 185-200, EP-A 569 804, EP-A 572 995, EP-A 645 411, EP-A 780 377, U.S. Pat. Nos. 5,315,004, 5,461,135, WO 97/45399 and WO 99/07765).

Tertiary phosphines, like tributyl phosphine, are the most important dimerizing catalysts for producing light-coloured polyisocyanates containing uretdione groups on an industrial scale. The resulting polyisocyanates are characterized by extraordinarily low viscosities and consequently are preferred as crosslinker components for low-solvent 'high-solids' coating compositions and also completely solvent-free coating compositions.

A substantial disadvantage of the uretdione polyisocyanates produced by catalysis with tertiary phosphines, however, is that they are not sufficiently stable with regard to breaking back down into free diisocyanates. Even at temperatures below the thermal decomposition temperature of uretdione structures, which are known to be thermally labile, for example at 50° C., these products tend to release considerable quantities of monomeric starting diisocyanates over time. The maximum concentration of 0.5 wt.-% of volatile monomeric diisocyanates, which must be adhered to for safe handling of lacquer polyisocyanates, can be exceeded under these conditions after only a few days, and usually after 3 to 4 weeks.

It is an object of the present invention to provide a new, improved, dimerization process, which produces uretdione polyisocyanates in which the content of monomeric starting diisocyanates does not increase significantly when stored for long periods at high temperatures. This object was achieved with the process according to the invention.

SUMMARY OF THE INVENTION

The present invention relates to a process for the production of polyisocyanates containing uretdione groups comprising the steps of oligomerizing a portion of the isocyanate groups of a starting diisocyanate with aliphatically and/or cycloaliphatically bonded isocyanate groups in the presence of a tertiary phosphine, terminating the oligomerization reaction at a desired oligomerization level and removal of the non-converted excess starting diisocyanate by extraction or thin-layer distillation, characterized in that the oligomerization reaction is carried out in the presence of ureas of formula (I) and/or amides of formula (II),

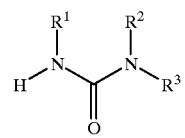

(I)

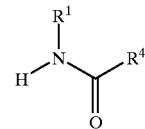

(II)

wherein

R$^1$, R$^2$ and R$^3$ represent independently of one another a hydrogen atom, a saturated or unsaturated aliphatic or cycloaliphatic, an optionally substituted aromatic or araliphatic group, which may contain up to 18 carbon atoms and optionally up to 3 hetero atoms selected from oxygen, sulfur, nitrogen, R$^4$ has the meaning given for R$^1$ to R$^3$ or represents the group

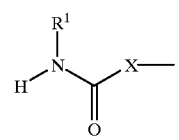

wherein X represents a divalent, optionally branched, aliphatic or cycloaliphatic group with up to 12 carbon atoms, and R$^1$ has the meaning given above, or R$^1$, R$^2$ and R$^3$ in formula (I), and R$^1$ and R$^4$ in formula (II) in combination with each other together with the nitrogen atoms of the urea or amide group, and optionally a further nitrogen atom or an oxygen atom can also form heterocyclic rings with 3 to 6 carbon atoms.

The invention also relates to polyurethane plastics prepared from the polyisocyanates containing uretdione groups produced according to this process. The invention also relates to a crosslinker component for binders or binder components with groups, which are reactive with isocyanate groups prepared from the polyisocyanates containing uretdione groups produced according to this process. Optionally, the polyisocyanates containing uretdione groups produced according to this process can be used while blocked with blocking agents.

DETAILED DESCRIPTION OF THE INVENTION

The starting compounds for the process according to the invention include diisocyanates with aliphatically and/or cycloaliphatically bonded isocyanate groups, in particular those of the molecular weight range 140 to 400. Examples include 1,4-diisocyanatobutane, 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,3- and 1,4-bis-(isocyanatomethyl)-cyclohexane, 1-isocyanato-3,3,5-trimethyl-5-isocyanatomethyl-cyclohexane (isophorone diisocyanate, IPDI), 4,4'-diisocyanatodicyclohexylmethane, 1-isocyanato-1-methyl-4(3)isocyanatomethylcyclohexane, bis-(isocyanatomethyl)-norbornane and 1,3- and 1,4-bis-(2-isocyanato-prop-2-yl)-benzene (TMXDI) as well as mixtures of such diisocyanates. These diisocyanates may be obtained by phosgenation or by phosgene-free processes, for example, thermal splitting of urethanes. Preferred starting compounds are HDI and/or IPDI.

Suitable catalysts for the process according to the invention include tertiary organic phosphines of formula (III)

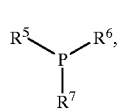
(III)

wherein
$R^5$, $R^6$ and $R^7$ independently of one another represent an alkyl or cycloalkyl group with up to 10, preferably 2 to 8 carbon atoms, an aralkyl group with 7 to 10, preferably with 7 carbon atoms, or an optionally alkyl-substituted aryl group with 6 to 10, preferably 6 carbon atoms, provided that at most one of the groups represents an aryl group and at least one of the groups represents an alkyl or cycloalkyl group, or wherein
$R^5$ and $R^6$ together with the phosphorus atom, form a heterocyclic ring with 4 to 6 atoms, $R^7$ representing an alkyl group with up to 4 carbon atoms,
or mixtures of such tertiary phosphines.

Suitable tertiary phosphines include triethylphosphine, dibutylethylhosphine, tri-n-propylphosphine, triisopropylphosphine, tri-tert-butylphosphine, tribenzylphosphine, dicyclopentylbutylphosphine, tricyclopentylphosphine, benzyldimethyl-phosphine, dimethylphenyl-phosphine, tri-n-butylphosphine, triisobutylphospine, triamylphosphine, trioctylphosphine or butyl-phosphacyclopentane.

The above-mentioned trialkylphosphines are preferred as catalysts for the process according to the invention. More preferred catalysts are tributylphosphine and/or trioctylphosphine.

These catalysts are generally used in a quantity of 0.01 to 5 wt.-%, preferably 0.1 to 3 wt.-%, based on the quantity of starting diisocyanate used.

Optionally, suitable co-catalysts can be used with the catalysts mentioned for the process according to the invention. Suitable co-catalysts include in particular low-molecular weight mono- or polyvalent aliphatic alcohols, preferably those in the molecular weight range 32 to 200. Those include, for example, methanol, ethanol, n-propanol, isopropanol, n-butanol, n-hexanol, 2-ethyl-1-hexanol, 1-methoxy-2-propanol, ethylene glycol, propylene glycol, the isomeric butane diols, hexane diols, or octane diols, and diethylene glycol, dipropylene glycol, 2-ethyl-1,3-hexane diol, 2,2,4-trimethylpentane diol, glycerine, trimethylolpropane or mixtures of such alcohols.

These co-catalysts are used in the process according to the invention, if at all, in quantities of up to 5 wt.-%, preferably from 0.5 to 3 wt.-%, based on the quantity of starting diisocyanate used.

The actual co-catalysts are the urethanes formed by the reaction of the co-catalysts with the starting diisocyanate. Therefore, instead of the alcohols mentioned, their urethanes obtained separately by reaction with isocyanates are also suitable as co-catalysts.

According to the invention, the oligomerization reaction is carried out in the presence of special stabilizers. These are ureas of formula (I) and/or amides of formula (II),

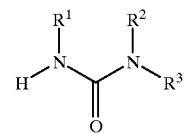
(I)

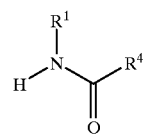
(II)

wherein
$R^1$, $R^2$ and $R^3$ are the same or different groups and represent a hydrogen atom, a saturated or unsaturated aliphatic or cycloaliphatic, an optionally substituted aromatic or araliphatic group, which may contain up to 18 carbon atoms and optionally up to 3 hetero atoms selected from oxygen, sulfur, and nitrogen,
$R^4$ has the meaning given for $R^1$ to $R^3$ or represents a group,

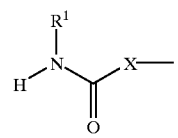

wherein
X represents a divalent, optionally branched, aliphatic or cycloaliphatic group with up to 12 carbon atoms,
or
$R^1$, $R^2$ and $R^3$ in formula (I), and
$R^1$ and $R^4$ in formula (II) in combination with each other together with the nitrogen atoms of the urea or amide group and optionally a further nitrogen atom or an oxygen atom can also form heterocyclic rings with 3 to 6 carbon atoms.

Preferred stabilizers are those of formula (I), wherein
$R^1$, $R^2$ and $R^3$ represent the same or different groups and in each case mean a hydrogen atom or a saturated or unsaturated aliphatic or cycloaliphatic group with up to 12 carbon atoms, and
$R^1$, $R^2$ and $R^3$ in combination with each other together with at least one nitrogen atom of the urea group and optionally a further nitrogen atom or an oxygen atom can also form heterocyclic rings with 3 to 6 carbon atoms.

More preferred ureas are those of formula (I), wherein
$R^1$ represents a hydrogen atom and
$R^2$ and $R^3$ are the same or different and represent a hydrogen atom or a saturated aliphatic or cycloaliphatic group with up to 8 carbon atoms.

Preferred stabilizers with amide structure are those of formula (II), wherein
$R^1$ represents a hydrogen atom or a saturated aliphatic or cycloaliphatic or an optionally substituted aromatic group with up to 12 carbon atoms, $R^4$ has the meaning given for $R^1$ or represents the group

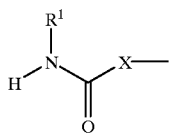

wherein X represents a divalent, linear or branched, aliphatic or cycloaliphatic group with up to 6 carbon atoms, and
$R^1$ and $R^4$ together with the nitrogen atom of the amide group and optionally a further nitrogen atom or an oxygen atom can also form heterocyclic rings with 3 to 6 carbon atoms.
Amides preferred in particular are those of formula (II), wherein
$R^1$ represents a hydrogen atom or a saturated aliphatic group with 1 to 4 carbon atoms and
$R^4$ represents an optionally substituted aromatic group with 1 to 12 carbon atoms,
those of formula (II), wherein
$R^1$ and $R^4$ together with the nitrogen atom of the amide group and optionally a further nitrogen atom or an oxygen atom form a heterocyclic ring with 3 to 6 carbon atoms, or those of the general formula (II), wherein
$R^1$ represents a hydrogen atom and
$R^4$ represents the group

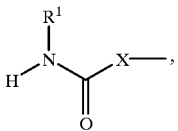

wherein X represents a divalent aliphatic group with up to 4 carbon atoms.

Suitable stabilizers include urea; substituted ureas, such as N-methyl urea, N-ethyl urea, N-n-butyl urea, N-tert.-butyl urea, N-(1-adamantyl)-urea, N-allyl urea, N-phenyl urea, N-benzyl urea, N,N-dimethyl urea, N,N-diethyl urea, N,N-di-n-butyl urea, N,N-diphenyl urea, N-(2-benzimidazolyl)-urea, N,N'-dimethyl urea, N,N'-diethyl urea, N,N'-dibutyl urea, N,N'-dicyclohexyl urea, N,N'-diallyl urea, N,N'-diphenyl urea, N,N'-ethylene urea and N,N'-propylene urea; amides, such as formamide, acetamide, propionic acid amide, butyric acid amide, stearic acid amide, N-methyl formamide, N-phenyl formamide, N-(4-methylphenyl)-formamide, cyanamide, N-methyl acetamide, cyanacetamide, N-phenyl acetamide, N-(4-methylphenyl)-acetamide, N-(4-methoxyphenyl)-acetamide, N-(2-ethoxy-1-naphthyl)-acetamide, acrylic acid amide, methacrylic acid amide, N-methoxymethyl methacrylamide, benzoic acid amide, 3-methyl benzoic acid amide, 3-methoxybenzoic acid amide, acetoacetic acid benzyl amide, N-phenyl benzamide, salicylamide, oxalic acid diamide, malonic acid diamide, succinic acid diamide, glutaric acid diamide, adipic acid diamide, fumaric acid diamide, N,N-methylene diacrylamide, 4-methoxy phthalic acid diamide, nicotinic acid amide, isonicotinic acid amide, 3,5-dimethyl pyrazol-1-carboxylic acid amide; and cyclic amides, such as 2-pyrrolidinone, 2-piperidinone (δ-valerolactam) and ε-caprolactam.

Preferred stabilizers are N-methyl urea, N-ethyl urea, N-n-butyl urea, N,N-dimethyl urea, N,N-diethyl urea, N,N-di-n-butyl urea, acetamide, oxalic acid diamide, malonic acid diamide, succinic acid diamide, glutaric acid diamide and/or adipic acid diamide. More preferred are N,N-dimethyl urea and/or N,N-diethyl urea.

These stabilizers are preferably used in quantities of 0.01 to 2 wt.-%, more preferably 0.05 to 1 wt.-% and most preferably 0.1 to 0.5 wt.-% based on the quantity of starting diisocyanate used.

Optionally, the oligomerization reaction in the process according to the invention is terminated at the desired reaction level, for example when 10 to 60 wt.-% of the original isocyanate groups present in the starting mixture have reacted, with the aid of suitable catalyst poisons. Such catalyst poisons (or stoppers) include alkylation agents such as dimethyl sulfate or p-toluene sulfonic acid methyl ester; acylating agents such as benzoyl chloride, acids such as perfluorobutane sulfonic acid, sulfur or sulfonyl iscocyanates, as mentioned for example in U.S. Pat. No. 4,614,785, column 5, line 27 to column 6, line 35; and also silylated acids for example of the type mentioned in EP-A 520 210.

The quantity of catalyst poison required to terminate the reaction is determined on the basis of the quantity of catalyst used. Generally an equimolar quantity of the stopper, based on the amount of dimerizing catalyst used at the beginning, is used. However, taking account of any catalyst losses during the reaction, 20-80%-equivalent of catalyst poison, based on the original quantity of catalyst used, should be sufficient to terminate the reaction.

The process according to the invention is carried out preferably without solvent. However it can also be carried out in the presence of solvents which are inert towards isocyanate groups. Suitable solvents include the conventional lacquer solvents for example ethyl acetate, butyl acetate, ethylene glycol monomethyl- or ethylether acetate, 1-methoxypropyl-2-acetate, 3-methoxy-n-butyl acetate, acetone, 2-butanone, methyl isobutyl ketone, 4-methyl-2-pentanone, cyclohexanone, hexane, toluene, xylene, chlorobenzene, white spirit, higher substituted aromatics (as available commercially for example under the names Solvent naphtha, Solvesso, Shellsol, Isopar, Nappar and Diasol), carbonic acid esters (such as dimethyl carbonate, diethyl carbonate, 1,2-ethylene carbonate and 1,2-propylene carbonate), lactones (such as β-propiolactone, γ-butyrolactone and ε-caprolactone), ethylglycol acetate, propylene glycol monomethylether acetate, propylene glycol diacetate, diethylene glycol dimethylether, dipropyleneglycol dimethylether, diethylene glycol ethyl- and butylether acetate, N-methyl pyrrolidone and N-methyl-caprolactam, and mixtures of such solvents.

To carry out the process according to the invention, the starting diisocyanate or a mixture of various starting diisocyanates, optionally under inert gas (such as nitrogen), and optionally in the presence of a suitable solvent of the type mentioned, is heated to a temperature between 20 and 100° C., preferably 20 to 70° C. After this, a tertiary phosphine of the type given above by way of example, in the quantity given above, is added as a dimerizing catalyst and the reaction temperature is set to a temperature of 20 to 120° C., preferably 25 to 80° C., optionally using suitable methods (heating, cooling). The urea or amide stabilizers and the alcohol-based co-catalysts optionally to be used can be added to the reaction mixture in any order and at any point in the reaction in the process according to the invention. For example, stabilizers and optionally co-catalysts can be added to the starting diisocyanate, both components can, for example, also be added only after the oligomerization catalyst. The stabilizers, which are often compounds solid at room temperature, are preferably added to the reaction mixture in dissolved form, for example in one of the above-mentioned solvents, but in particular in one of the alcohol-based co-catalysts suitable for use as a solvent, in order to simplify handling.

The reaction can optionally be terminated when an oligomerization level of 10 to 60%, preferably 10 to 40% is reached, by adding a catalyst poison and, optionally, then heating the reaction mixture to a temperature above 80° C., preferably above 120° C. for a short time. The 'oligomerization level' is deemed to be the percentage of the isocyanate groups originally present in the starting mixture, which is reacted during the reaction according to the invention (in particular by dimerization, and also during trimerization and, if the co-catalysts described, for example those based on alcohols, are also used, by reaction with isocyanate groups, for example by urethanization). The stated level of oligomerization is generally reached after a reaction time of 1 to 48, preferably 2 to 24 hours.

The reaction mixture is then preferably liberated from volatile components (excess monomeric diisocyanates and solvents and, if a catalyst poison is not used, optionally active catalyst) by thin-layer distillation in a high vacuum under the mildest possible conditions, for example at a temperature of 100 to 200° C., preferably 120 to 180° C.

The resulting distillates which, besides the un-converted monomeric starting diisocyanates and optional solvents, may optionally also contain active catalyst if no catalyst poison has been used, can easily be reused for oligomerization.

In a further embodiment of the process according to the invention, the volatile constituents mentioned are separated from the oligomerization product by extraction with suitable solvents which are inert towards isocyanate groups, for example, aliphatic or cycloaliphatic hydrocarbons, such as pentane, hexane, heptane, cyclopentane or cyclohexane.

Irrespective of how or when the stabilizer is added during the oligomerization, light-colored polyisocyanate mixtures having uretdione groups are obtained in this way which, depending on type of starting diisocyanate used, are either liquid or highly viscous at room temperature, and which contain 10 to 30 wt.-%, preferably 15 to 25 wt.-% of aliphatically and/or cycloaliphatically bonded isocyanate groups, and contain less than 1 wt.-%, preferably less than 0.5 wt.-%, more preferred less than 0.3 wt.-% monomeric starting diisocyanates.

In comparison with uretdione polyisocyanates, which are produced according to dimerization processes of the prior art, using tertiary phosphine catalysis but without the addition of the urea and/or amide stabilizers which are fundamental to the invention, the products of the process according to the invention obtained after monomer separation by thin-layer distillation under comparable distillation conditions already have a much lower residual monomer content and in addition are also characterized by considerably improved decomposition stability. Even after several weeks of high-temperature storage at 50° C., there is only a negligible increase in the residual monomer content of the uretdione polyisocyanates produced according to the invention. The process according to the invention thus provides a simple means of producing polyisocyanates containing uretdione groups, in which the maximum concentration of 0.5 wt.-% volatile monomeric diisocyanates, which must be adhered to for safe handling, is not exceeded, even during long periods of storage.

The products of the process according to the invention are valuable raw materials for the production of polyurethane plastics by the polyaddition process. They are suited in particular, optionally blocked with blocking agents for isocyanate groups, as crosslinker components for coating composition binders or coating composition binder components with groups which are reactive with isocyanate groups during the production of one- or two-component polyurethane coating compositions or adhesives.

EXAMPLES

Unless stated otherwise, all percentages are given in relation to weight.

Example 1

To 1000 g (5.95 mol) hexamethylene diisocyanate (HDI) were added at room temperature under dry nitrogen, one after the other, 2 g (0.2%) N,N-diethyl urea as a stabilizer, 10 g (1.0%) 1,3-butanediol as a co-catalyst and 3 g (0.3%/ 0.015 mol) tri-n-butylphosphine as a catalyst, and this mixture was then heated to 60° C. After a reaction time of 4 hours, the NCO content of the reaction mixture was 40.4%, equivalent to an oligomerization level of 18.0%. The reaction was terminated by adding 2.8 g (0.015 mol) p-toluene sulfonic acid methylester and heating for one hour to 80° C. After thin-layer distillation at a temperature of 130° C. and a pressure of 0.15 mbar, a colorless polyisocyanate containing uretdione groups with an NCO content of 21.4%, a monomeric HDI content of 0.07% and a viscosity (to DIN 53 018) of 185 mPas (23° C.) was obtained.

For comparison, an HDI polyisocyanate was produced in a similar way, but without using N,N-diethyl urea. The practically colorless resin obtained after thin-layer distillation at 130° C. and 0.15 mbar had an NCO content of 21.5%, a monomeric HDI content of 0.33% and a viscosity (to DIN 53 018) of 190 mPas (23° C.).

Both polyisocyanates were then stored at 50° C. The contents of monomeric HDI were determined at 7 day (d) intervals in each case. The following table shows the values found.

|  | Polyisocyanate, according to the to the invention | | Reference polyisocyanate | |
| --- | --- | --- | --- | --- |
|  | HDI [%] | Δ$^{a)}$ [%] | HDI [%] | Δ$^{a)}$ [%] |
| Start | 0.07 | — | 0.33 | — |
| 7 d | 0.13 | 0.06 | 0.55 | 0.23 |
| 14 d | 0.15 | 0.08 | 0.61 | 0.28 |
| 21 d | 0.24 | 0.17 | 0.64 | 0.31 |
| 28 d | 0.26 | 0.19 | 0.67 | 0.34 |
| 35 d | 0.28 | 0.21 | 0.71 | 0.38 |

$^{a)}$Difference from the initial content of monomeric HDI

The comparison showed that the uretdione polyisocyanate produced according to the invention in the presence of the urea stabilizer was obtained with a much lower monomer content in spite of having the same distillation conditions. While the HDI content of the polyisocyanates produced according to the invention was still well below the 0.5% limit after being stored for five weeks at 50° C., this value was exceeded after only 7 days by the comparison product produced without the addition of stabilizers.

Examples 2–8

Uretdione polyisocyanates were produced by the process described in Example 1, prepared from HDI, using various stabilizers. To improve handling, each stabilizer was used in the form of a solution in the alcohol-based co-catalyst, 1,3-butanediol. In all cases the oligomerization level was between 18 and 19%. The following table shows the type and quantity of stabilizers used (based on the quantity of starting diisocyanate used in each case) together with the reference data and storage stability of the resins obtained after thin-layer distillation.

| | | Vis- | | |
| | NCO | cosity | Monom. HDI [%] | |
| Ex. Stabilizer/quantity | [%] | [mPas] | Immed. | 28d/50° C. |
| 2 N,N-diethyl urea/0.1% | 21.5 | 180 | 0.07 | 0.21 |
| 3 N,N-diethyl urea/0.5% | 21.5 | 180 | 0.14 | 0.35 |
| 4 N,N-dimethyl urea/0.2% | 21.6 | 170 | 0.05 | 0.26 |
| 5 N,N'-carbonyl-diimidazole/0.2% | 21.5 | 175 | 0.12 | 0.24 |
| 6 Acetamide/0.2% | 21.6 | 170 | 0.09 | 0.31 |
| 7 Malonic acid diamide/0.2% | 21.4 | 190 | 0.08 | 0.30 |
| 8 4-methylbenzoic acid amide/0.2% | 21.4 | 205 | 0.08 | 0.29 |

Example 9

To 1000 g (4.50 mol) isophorone diisocyanate (IPDI) were added at room temperature under dry nitrogen, one after the other, 2 g (0.2%) N,N-diethyl urea as a stabilizer and 10 g (1.0%/0.05 mol) tri-n-butylphosphine as a catalyst and this was then agitated for 40 h until the NCO content of the reaction mixture had fallen to 32.9%, corresponding to an oligomerization level of 11.9%. The reaction was stopped by adding 9.3 g (0.05 mol) p-toluene sulfonic acid methylester and heating for half an hour to 80° C. After thin-layer distillation at a temperature of 160° C. and a pressure of 0.15 mbar, a highly viscous pale yellow uretdione polyisocyanate with an NCO content of 17.2% and a monomeric IPDI content of 0.24% was obtained.

For comparison, an IPDI polyisocyanate was produced in a similar manner but without using N,N-diethyl urea. The pale yellow resin obtained after thin-layer distillation had an NCO content of 17.3% and a monomeric IPDI content of 0.27%.

Both polyisocyanates were stored at 50° C. for 4 weeks and the contents of monomeric IPDI were then determined again. The monomer content of the polyisocyanate produced according to the invention increased by 0.20% to 0.44%, while that of the comparison polyisocyanate increased by 0.39% to 0.66%.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of polyisocyanates containing uretdione groups comprising the steps of
oligomerizing a portion of the isocyanate groups of a starting diisocyanate with aliphatically and/or cycloaliphatically bonded isocyanate groups in the presence of a tertiary phosphine,
terminating the oligomerization reaction at a desired oligomerization level and removal of the non-converted excess starting diisocyanate by extraction or thin-layer distillation,
characterized in that the oligomerization reaction is carried out in the presence of ureas of formula (I) and/or amides of formula (II),

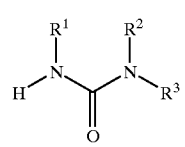

(I)

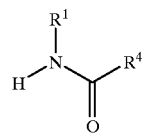

(II)

wherein
$R^1$, $R^2$ and $R^3$ represent independently of one another a hydrogen atom, a saturated or unsaturated aliphatic or cycloaliphatic, an optionally substituted aromatic or araliphatic group, which may contain up to 18 carbon atoms and optionally up to 3 hetero atoms selected from oxygen, sulfur, nitrogen,
$R^4$ has the meaning given for $R^1$ to $R^3$ or represents the group

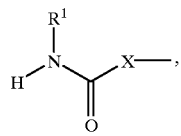

wherein X represents a divalent, optionally branched, aliphatic or cycloaliphatic group with up to 12 carbon atoms, and $R^1$ has the meaning given above,
or
$R^1$, $R^2$ and $R^3$ in formula (I), and
$R^1$ and $R^4$ in formula (II) in combination with each other together with the nitrogen atoms of the urea or amide group, and optionally a further nitrogen atom or an oxygen atom can also form heterocyclic rings with 3 to 6 carbon atoms.

2. The process of claim 1, wherein the diisocyanates comprise 1,6-diisocyanatohexane and/or 1-isocyanato-3,3,5-trimethyl-5-isocyanatomethyl cyclohexane.

3. The process of claim 1, wherein the tertiary phosphine comprises trialkyl phosphine.

4. The process of claim 1, wherein the tertiary phosphines are tributyl phosphine and/or trioctyl phosphine.

5. The process of claim 1, wherein the ureas are described by formula (I), wherein
$R^1$, $R^2$ and $R^3$ represent independently of one another a hydrogen atom or a saturated or unsaturated aliphatic or cycloaliphatic group with up to 12 carbon atoms, and
$R^1$, $R^2$ and $R^3$ in combination with each other together with at least one nitrogen atom of the urea group and optionally a further nitrogen atom or an oxygen atom, can also form heterocyclic rings with 3 to 6 carbon atoms.

6. The process of claim 1, wherein the ureas are described by formula (I), wherein
$R^1$ represents a hydrogen atom, and $R^2$ and $R^3$ each represent a hydrogen atom or a saturated aliphatic or cycloaliphatic group with up to 8 carbon atoms.

7. The process of claim 1, wherein the amides are described by formula (II), wherein $R^1$ represents a hydrogen atom or a saturated aliphatic or cycloaliphatic or an optionally substituted aromatic group with up to 12 carbon atoms, $R^4$ has the meaning given for $R^1$ or represents the group

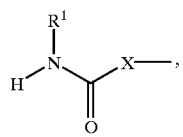

wherein X represents a divalent, optionally branched aliphatic or cycloaliphatic group with up to 6 carbon atoms, and $R^1$ has the given meaning, and $R^1$ and $R^4$ together with the nitrogen atom of the amide group and optionally a further nitrogen atom or an oxygen atom can also form heterocyclic rings with 3 to 6 carbon atoms.

8. The process of claim 1, wherein the amides are described by formula (II), wherein $R^1$ represents a hydrogen atom or a saturated aliphatic group with 1 to 4 carbon atoms, and $R^4$ represents an optionally substituted aromatic group with 1 to 12 carbon atoms.

9. The process of claim 1, wherein the amides are described by formula (II), wherein $R^1$ and $R^4$ together with the nitrogen atom of the amide group and optionally a further nitrogen atom or an oxygen atom form a heterocyclic ring with 3 to 6 carbon atoms, or wherein $R^1$ represents a hydrogen atom, and $R^4$ represents the group

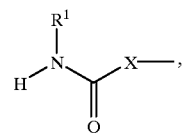

wherein X represents a divalent aliphatic group with up to 4 carbon atoms.

10. The process of claim 1, wherein the urea is N,N-dimethyl urea and/or N,N-diethyl urea.

11. The process of claim 1, wherein the stabilizer is present in a quantity of 0.02 to 2 wt.-% based on the weight of the starting diisocyanate.

12. The process of claim 1, wherein the stabilizer is present in a quantity of 0.05 to 1 wt.-% based on the weight of the starting diisocyanate.

13. A method of producing polyurethane plastics comprising the step of reacting the polyisocyanates containing uretdione groups according to claim 1 as starting components.

14. A binder composition comprising a crosslinker composition comprising the polyisocyanates containing uretdione groups according to claim 1, optionally in the form in which they are blocked with blocking agents.

* * * * *